(12) United States Patent
Lee et al.

(10) Patent No.: US 7,904,714 B2
(45) Date of Patent: Mar. 8, 2011

(54) APPARATUS AND METHOD FOR CIPHERING/DECIPHERING A SIGNAL IN A COMMUNICATION SYSTEM

(75) Inventors: Ji-Cheol Lee, Yongin-si (KR); Jun-Hyuk Song, Anyang-si (KR); Geun-Hwi Lim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1444 days.

(21) Appl. No.: 11/330,310

(22) Filed: Jan. 11, 2006

(65) Prior Publication Data
US 2007/0192594 A1 Aug. 16, 2007

(30) Foreign Application Priority Data
Jan. 11, 2005 (KR) .................. 10-2005-0002704

(51) Int. Cl.
*H04L 29/06* (2006.01)
(52) U.S. Cl. .......... 713/163; 713/151; 380/210; 380/240
(58) Field of Classification Search .................. 713/163
See application file for complete search history.

(56) References Cited

U.S. PATENT DOCUMENTS

| | | | |
|---|---|---|---|
| 3,291,908 | A | 12/1966 | Ehrat |
| 5,673,318 | A | 9/1997 | Bellare et al. |
| 6,249,582 | B1 | 6/2001 | Gilley |
| 7,177,424 | B1 | 2/2007 | Furuya et al. |
| 7,336,783 | B2 | 2/2008 | Park |
| 2002/0044651 | A1 | 4/2002 | Tuvell |
| 2002/0164029 | A1 | 11/2002 | Jiang |
| 2003/0206538 | A1 | 11/2003 | Rezaiifar et al. |
| 2004/0151109 | A1* | 8/2004 | Batra et al. ............ 370/208 |
| 2004/0161105 | A1 | 8/2004 | Park et al. |
| 2005/0143843 | A1* | 6/2005 | Bogin et al. ............ 700/20 |
| 2006/0056637 | A1 | 3/2006 | Rezaiifar et al. |
| 2006/0126843 | A1 | 6/2006 | Brickell et al. |
| 2006/0210065 | A1 | 9/2006 | Ito et al. |

FOREIGN PATENT DOCUMENTS

| | | |
|---|---|---|
| CN | 1451212 | 10/2003 |
| EP | 0 853 288 | 7/1998 |
| JP | 6-315027 | 11/1994 |
| JP | 2000-228072 | 8/2000 |
| JP | 2001-007800 | 1/2001 |
| JP | 2004-226969 | 8/2004 |

(Continued)

OTHER PUBLICATIONS

Abdalla et al., Key Management For Restricted Multicast Using Broadcast Encryption, IEEE/ACM Transactions on Networking, vol. 8, Issue 4, Aug. 2000, pp. 443-454. Ohta et al., Encryption Techniques For Broadcast Communications, Global Telecommunications Conference, 1991. GLOBECOM'91, Dec. 2-5, 1991, vol. 1, pp. 195-200.

(Continued)

*Primary Examiner* — Kimyen Vu
*Assistant Examiner* — Yogesh Paliwal
(74) *Attorney, Agent, or Firm* — The Farrell Law Firm, P.C.

(57) ABSTRACT

In a communication system, second encryption information is generated using first encryption information when data to be transmitted is generated. The data is encrypted using the second encryption information and third encryption information. A signal including the encrypted data and the first encryption information is generated and transmitted.

7 Claims, 6 Drawing Sheets

FOREIGN PATENT DOCUMENTS

| | | |
|---|---|---|
| JP | 2004-254313 | 9/2004 |
| JP | 2008-523728 | 7/2008 |
| KR | 1020010005012 | 1/2001 |
| KR | 1020030085356 | 11/2003 |
| KR | 1020040045517 | 6/2004 |
| KR | 1020050107535 | 11/2005 |
| RU | 99121330 | 8/2001 |
| RU | 2002111551 | 10/2003 |
| WO | WO 98/40984 | 9/1998 |
| WO | WO 01/24436 | 4/2001 |
| WO | WO 01/86860 | 11/2001 |
| WO | WO 03/061192 | 7/2003 |
| WO | WO 2005/010850 | 2/2005 |

OTHER PUBLICATIONS

IEEE Computer Society and IEEE Microwave Theory and Techniques Society: Part 16: Air Interface for Fixed and Mobile Broadband Wireless Access Systems. Amendment for Physical and Medium Access Control Layers for Combined Fixed and Mobile Operation in Licensed Bands, Sep. 18, 2004, pp. 135-152.

JunHyuk Soong, "MBS (Multimedia Multicast/Broadcast Service) Security Framework Proposal", IEEE C802.16e-04/63, May 7, 2004.

Information Technology—Telecommunications and Information Exchange Between Systems—LAN/MAN Specific Requirements—"Air Interface for Fixed Broadband Wireless Access Systems", IEEE 802.16.1-00/01r4, Sep. 2000.

* cited by examiner

APPARATUS AND METHOD FOR CIPHERING/DECIPHERING A SIGNAL IN A COMMUNICATION SYSTEM

PRIORITY

This application claims priority under 35 U.S.C. §119 to an application filed in the Korean Intellectual Property Office on Jan. 11, 2005 and assigned Serial No. 2005-2704, the contents of which are incorporated herein by reference.

BACKGROUND OF THE INVENTION

1. Field of the Invention

The present invention relates to an apparatus and method for ciphering/deciphering a signal in a communication system.

2. Description of the Related Art

Extensive research is being conducted into the next generation communication systems for providing users with services based on various qualities of service (QoSs) at a high transmission rate.

A wireless local area network (LAN) communication system and a wireless metropolitan area network (MAN) communication system support a high transmission rate. The wireless MAN communication system serves as a broadband wireless access (BWA) communication system, and supports a wider service area and a higher transmission rate than the wireless LAN communication system. In the next generation communication system, extensive research is being conducted to develop a new communication system capable of ensuring the mobility and QoS for subscriber stations (SSs) in the wireless LAN and MAN communication systems for ensuring a relatively high transmission rate such that high-speed services provided by the next generation communication system can be supported.

A system for exploiting orthogonal frequency division multiplexing (OFDM) and orthogonal frequency division multiple access (OFDMA) schemes for supporting a broadband transmission network in a physical channel of the wireless MAN communication system is based on the Institute of Electrical and Electronics Engineers (IEEE) 802.16 communication standard, referred to herein as the IEEE 802.16 communication system. Because the IEEE 802.16 communication system exploits the OFDM/OFDMA scheme in the wireless MAN communication system, a physical channel signal can be transmitted through a plurality of subcarriers and therefore high-speed data can be transmitted. For convenience of explanation, the IEEE 802.16 communication system will be described by way of an example of the BWA communication system.

As described above, extensive research is being conducted to provide high-speed data transmission in the IEEE 802.16 communication system, and more particularly to provide multicast and broadcast service (MBS) that can provide a plurality of SSs with an identical service while minimizing resources. MBS providers need to consider user authentication and accounting. To perform the user authentication and accounting for an SS receiving MBS data, a point in time when the SS starts to receive the MBS data and a point in time when the MBS data reception is stopped must be correctly detected. For this, a transmitter (e.g., a base station (BS)) for transmitting the MBS data ciphers MBS data such that the MBS data can be received in only receivers (e.g., SSs) to which service fees can be charged. When receiving the MBS data, the SSs must decipher the ciphered MBS data. The BS must send deciphering information to the SSs such that they receive and decipher the MBS data ciphered by the BS.

An ciphering/deciphering operation in an Advanced Encryption Standard (AES)-Counter mode (CTR) for defining ciphering and deciphering schemes used in the IEEE 802.16 communication system will be described with reference to FIGS. 1 and 2.

FIG. 1 illustrates an MBS payload format used in the conventional IEEE 802.16 communication system.

Referring to FIG. 1, an MBS payload includes a generic medium access control (MAC) header (GMH) field 111, a NONCE field 113, and an MBS stream field 115, and a cyclic redundancy check (CRC) field 117.

The GMH header field 111 includes a GMH header serving as a MAC header with a preset length. The NONCE field 113 includes a nonce used to generate an initial counter value of a counter in the AES-CTR mode. The MBS stream field 115 includes an MBS stream. The CRC field 117 includes a CRC value for checking an error of the MBS payload. The MBS stream included in the MBS stream field 115 is generated from ciphered MBS data. It is preferred that a nonce size is identical with a size of MBS data before ciphering. However, the nonce size does not need to be identical with the size of MBS data before ciphering. In the IEEE 802.16 communication system, the nonce size is set to 32 bits.

FIG. 2 is a block diagram illustrating the structure of the AES-CTR ciphering apparatus used in the AES-CTR mode of the conventional IEEE 802.16 communication system.

Referring to FIG. 2, the AES-CTR ciphering apparatus includes an AES-CTR ciphering unit 200 and an initial counter value generator 211. The AES-CTR ciphering unit 200 includes a counter 213, n cipher block generators, i.e., the first to n-th cipher block generators 215-1 to 215-$n$, and n exclusive OR (XOR) logical operators, i.e., the first to n-th XOR logical operators 217-1 to 217-$n$.

MBS data to be transmitted, a nonce, and an MBS traffic key (MTK) are input to the AES-CTR ciphering unit 200 when the MBS data to be transmitted is generated. The MBS data is fragmented into n plain texts, i.e., the first to n-th plain texts. Each of the n plain texts is input to an associated XOR logical operator. That is, the first plain text is input to the first XOR logical operator 217-1. In this manner, the n-th plain text is input to the n-th XOR logical operator 217-$n$. The nonce is set to a 32-bit random number in the current IEEE 802.16 communication system. The 32-bit nonce is input to the initial counter value generator 211. The MTK is input to the first to n-th cipher block generators 215-1 to 215-$n$.

The initial counter value generator 211 receives the nonce and generates a 128-bit initial counter value by repeating the received nonce a preset number of times, for example, four times. Then, the initial counter value generator 211 outputs the generated initial counter value to the counter 213. The counter 213 receives the initial counter value from the initial counter value generator 211 and increments the initial counter value by one, n number of times, thereby generating n counter values. The counter 213 outputs each of the n counter values to an associated cipher block generator. That is, the counter 213 outputs to the first cipher block generator 215-1 the first counter value generated by incrementing the initial counter value by one. The counter 213 outputs to the second cipher block generator 215-2 the second counter value generated by incrementing the initial counter value by two. In this manner, the counter 213 outputs to the n-th cipher block generator 215-$n$ the n-th counter value generated by incrementing the initial counter value by n.

Each of the n cipher block generators receives the MTK and a counter value output from the counter 213, generates a cipher block, and outputs the generated cipher block to an associated XOR logical operator. That is, the first cipher block generator 215-1 generates the first cipher block using the MTK and the first counter value output from the counter 213, and then outputs the generated cipher block to the first XOR logical operator 217-1. In this manner, the n-th cipher block generator 215-*n* generates the n-th cipher block using the MTK and the n-th counter value output from the counter 213, and then outputs the generated cipher block to the n-th XOR logical operator 217-*n*.

Each of the n XOR logical operators receives an associated plain text and a cipher block output from an associated cipher block generator, performs the XOR logical operation on the plain text and the cipher block, and generates and outputs an MBS stream. That is, the first XOR logical operator 217-1 receives the first plain text and the first cipher block output from the first cipher block generator 215-1, performs an XOR logical operation on the first plain text and the first cipher block, and generates and outputs the first MBS stream. In this manner, the n-th XOR logical operator 217-*n* receives the n-th plain text and the n-th cipher block output from the n-th cipher block generator 215-*n*, performs an XOR logical operation on the n-th plain text and the n-th cipher block, and generates and outputs the n-th MBS stream.

Because the AES-CTR ciphering unit uses an identical MTK as described above, more stable ciphering t can be performed by changing the initial counter value of the counter during a time interval using the identical MTK. Because the current IEEE 802.16 communication system generates a nonce in the form of a random number, an initial counter value of a previous time interval, before an MTK is refreshed, may be reused in a subsequent time interval. In this case, the stability of an ciphering operation may not be ensured. It is very important that a repeat of an initial counter value or a collision between initial counter values is avoided. Because there is the danger of hacking when an initial counter value is identical in a time interval using an identical MTK, the initial counter value must not be repeated in the time interval using the identical MTK.

It is very important that not only encryption is stable, but also an amount of data to be additionally transmitted for ciphering and deciphering is minimized when the overall performance of a system is considered. However, data transmission capacity is lowered due to a nonce because a 32-bit nonce must be transmitted in every MBS stream as in the current IEEE 802.16 communication system.

SUMMARY OF THE INVENTION

It is, therefore, an object of the present invention to provide an apparatus and method for ciphering/deciphering a signal in a communication system.

It is another object of the present invention to provide an apparatus and method for ciphering/deciphering a signal that can avoid a collision between initial counter values when an Advanced Encryption Standard (AES)-Counter mode (CTR) is used in a communication system.

It is yet another object of the present invention to provide an apparatus and method for ciphering/deciphering a signal that can minimize additional data transmission when an Advanced Encryption Standard (AES)-Counter mode (CTR) is used in a communication system.

In accordance with an aspect of the present invention, there is provided an apparatus for transmitting a signal in a communication system, including a second-encryption-information generator for generating second encryption information using first encryption information; an encryptor for encrypting data using the second encryption information and third encryption information when the data to be transmitted is generated; and a signal generator for generating and transmitting a signal comprising the encrypted data and the first encryption information.

In accordance with another aspect of the present invention, there is provided an apparatus for transmitting multicast and broadcast service (MBS) streams in a communication system, including an initial counter value generator for generating an initial counter value using a frame number of the communication system and a rollover counter (ROC); a counter for generating n counter values by incrementing by one the initial counter value when MBS data to be transmitted is generated; n cipher block generators for generating n cipher blocks using the n counter values and an MBS traffic key (MTK); and n exclusive OR (XOR) logical operators for performing XOR logical operations on the cipher blocks and n plain texts into which the MBS data is fragmented, and generating MBS streams.

In accordance with another aspect of the present invention, there is provided a method for transmitting a signal in a communication system, including the steps of generating second encryption information using first encryption information when data to be transmitted is generated; encrypting the data using the second encryption information and third encryption information; and generating and transmitting a signal comprising the encrypted data and the first encryption information.

In accordance with yet another aspect of the present invention, there is provided a method for transmitting multicast and broadcast service (MBS) streams in a communication system, including the steps of generating an initial counter value using a frame number of the communication system and a rollover counter (ROC) when MBS data to be transmitted is generated; generating n counter values by incrementing by one the initial counter value; generating n cipher blocks using the n counter values and an MBS traffic key (MTK); fragmenting the MBS data into n plain texts; generating MBS streams by performing exclusive OR (XOR) logical operations on the n plain texts and the cipher blocks; and generating and transmitting n MBS payloads that comprise one of the n MBS streams and the ROC, respectively.

BRIEF DESCRIPTION OF THE DRAWINGS

The above and other objects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, only parts needed to understand the operation of the present invention will be described, and other parts are omitted for clarity and conciseness.

The present invention proposes an apparatus and method for ciphering/deciphering a signal in a communication system. The signal ciphering/deciphering apparatus and method disclosed herein is based on the Institute of Electrical and Electronics Engineers (IEEE) 802.16 communication system corresponding to a broadband wireless access (BWA) communication system by way of example. The signal ciphering/deciphering apparatus and method proposed by the present invention can be applied to other communication systems as well as the IEEE 802.16 communication system.

Figure 1:
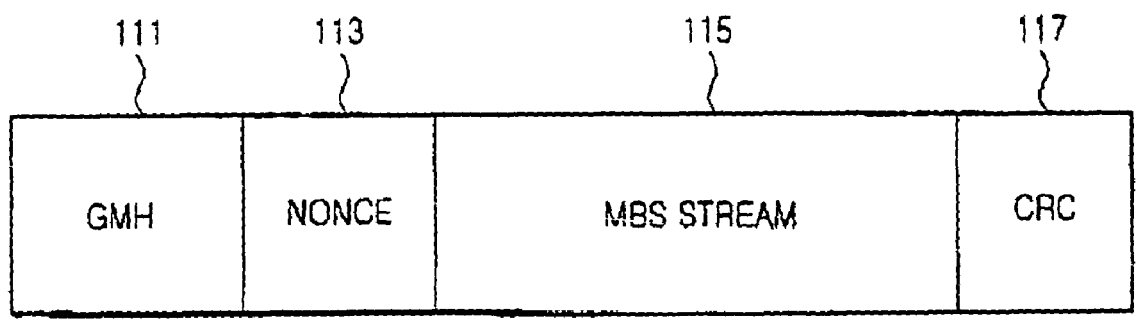
FIG. 1 illustrates a multicast and broadcast service (MBS) payload format used in a conventional Institute of Electrical and Electronics Engineers (IEEE) 802.16 communication system.
Figure 2:
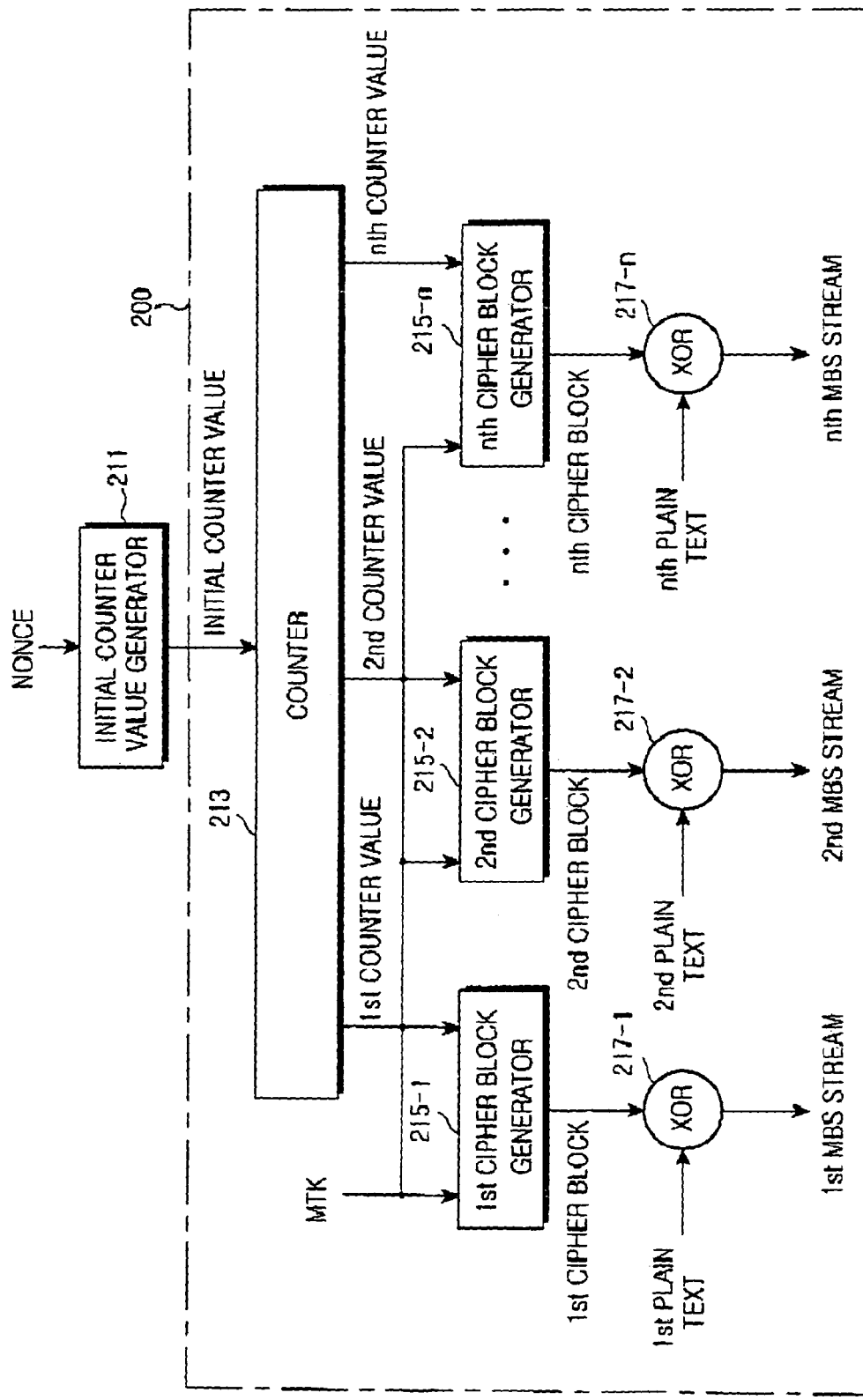
FIG. 2 is a block diagram illustrating a structure of an Advanced Encryption Standard (AES)-Counter mode (CTR) ciphering apparatus used in AES-CTR mode of the conventional IEEE 802.16 communication system.
Figure 3:
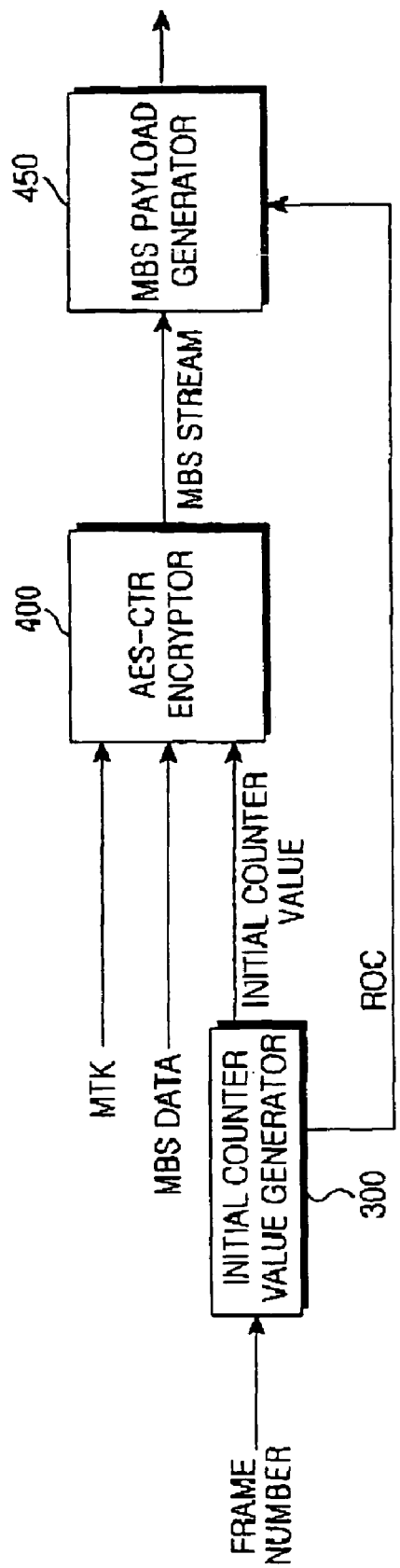
FIG. 3 is a block diagram illustrating an apparatus for transmitting a signal in an IEEE 802.16 communication system in accordance with an embodiment of the present invention.

FIG. 3 is a block diagram illustrating an apparatus for transmitting a signal in the IEEE 802.16 communication system in accordance with an embodiment of the present invention.

Referring to FIG. 3, the signal transmission apparatus includes an Advanced Encryption Standard (AES)-Counter mode (CTR) ciphering apparatus used in AES-CTR mode and a multicast and broadcast service (MBS) payload generator 450. The AES-CTR ciphering apparatus includes an initial counter value generator 300 and an AES-CTR ciphering unit 400. Because a structure of the AES-CTR ciphering unit 400 will be described below with reference to FIG. 4, a detailed description of the AES-CTR ciphering unit 400 is omitted here.

Research is actively being conducted to provide the MBS of the IEEE 802.16 communication system. Because MBS data needs to be ciphered and deciphered between a transmitter (e.g., a base station (BS)) and receivers (e.g., subscriber stations (SSs)) such that the MBS can be provided, the AES-CTR mode and ciphering and deciphering schemes for providing the MBS are defined. The BS must transmit deciphering information to the SSs such that they can decipher the ciphered MBS data. In the IEEE 802.16 communication system, data used to generate an initial counter value as the deciphering information must be included and transmitted in an MBS payload. The present invention proposes a rollover counter (ROC) as the data used to generate the initial counter value. Here, the ROC increases whenever a frame number used in a physical (PHY) layer of the IEEE 802.16 communication system increases. For example, the ROC is expressed by 8 bits. In the IEEE 802.16 communication system, the frame number is expressed by 24 bits.

The present invention generates 32 bits using an 8-bit ROC and a 24-bit frame number, repeats the 32 bits a preset number of times, for example, four times, and generates a 128-bit initial counter value. As a result, the present invention can perform reliable encryption and decryption because a collision between the initial counter values will not occur due to a change of the frame number or ROC in a time interval using an identical MBS traffic key (MTK). That is, reliable ciphering and deciphering are possible because an initial counter value is not reused when a period in which the MTK is refreshed is set to be longer than a period in which the ROC is repeated.

Referring to FIG. 3, an initial counter value generator 300 increases the ROC whenever there is an increase of the frame number of the PHY layer of the IEEE 802.16 communication system. The initial counter value generator 300 concatenates the 24-bit frame number and the 8-bit ROC to generate 32 bits, and repeats the 32 bits four times to generate a 128-bit initial counter value. Then, the initial counter value generator 300 outputs the 128-bit initial counter value to the AES-CTR ciphering unit 400. Moreover, the initial counter value generator 300 outputs the ROC to the MBS payload generator 450.

When MBS data to be transmitted is generated, the MBS data, the MTK and the initial counter value are input to the AES-CTR ciphering unit 400. The AES-CTR ciphering unit 400 receives the MBS data, the MTK, and the initial counter value, encrypts the MBS data to generate an MBS stream, and outputs the generated MBS stream to the MBS payload generator 450. The MBS payload generator 450 generates an MBS payload including the MBS stream output from the AES-CTR ciphering unit 400 and the ROC output from the initial counter value generator 300. A structure of a transmitter for transmitting the MBS payload is not illustrated in FIG. 3. The MBS payload is transmitted to SSs through the transmitter.

Figure 4:
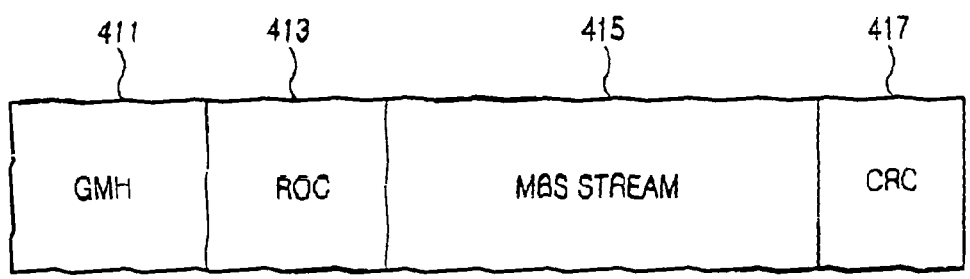
FIG. 4 illustrates an MBS payload format in accordance with an embodiment of the present invention.

FIG. 4 illustrates the MBS payload format in accordance with an embodiment of the present invention.

Referring to FIG. 4, the MBS payload includes a generic medium access control (MAC) header (GMH) field 411, an ROC field 413, an MBS stream field 415, and a cyclic redundancy check (CRC) field 417.

The GMH field 411 includes a GMH corresponding to a MAC header with a preset length. The ROC field 413 includes an ROC to be used to generate an initial counter value in the AES-CTR mode. The MBS stream field 415 includes an MBS stream. The CRC field 417 includes a CRC value for checking an error of the MBS payload. Here, the MBS stream included in the MBS stream field 415 is generated from encrypted MBS data. A ROC size is 8 bits as described above. Because the ROC size is less than the 32-bit nonce used to generate the initial counter value in the conventional IEEE 802.16 communication system, a gain is obtained in terms of the data transmission.

Figure 5:
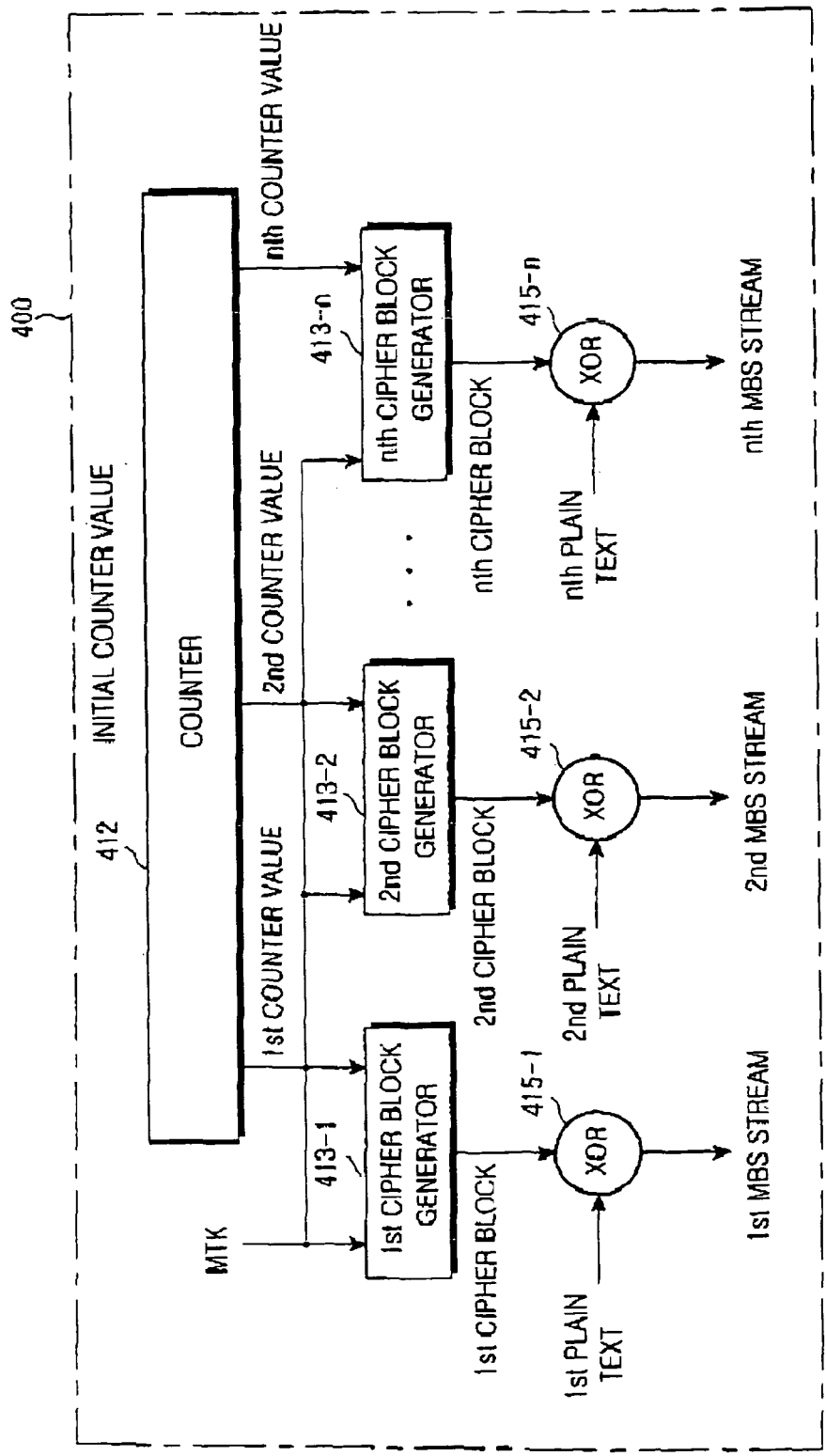
FIG. 5 is a block diagram illustrating a structure of an AES-CTR ciphering unit 400 of FIG. 3.

FIG. 5 is a block diagram illustrating the structure of the AES-CTR ciphering unit 400 of FIG. 3.

Referring to FIG. 5, the AES-CTR ciphering unit 400 includes a counter 412, n cipher block generators, i.e., the first to n-th cipher block generators 413-1 to 413-n, and n exclusive OR (XOR) logical operators, i.e., the first to n-th XOR logical operators 415-1 to 415-n.

MBS data to be transmitted, an initial counter value, and an MTK are input to the AES-CTR ciphering unit 400 when the MBS data to be transmitted is generated. The MBS data is fragmented into n plain texts, i.e., the first to n-th plain texts. Each of the n plain texts is input to an associated XOR logical operator. The first plain text is input to the first XOR logical operator 415-1. In this manner, the n-th plain text is input to the n-th XOR logical operator 415-n. The MTK is input to the first to n-th cipher block generators 413-1 to 413-n.

The counter 412 receives the initial counter value and increments the initial counter value by one, n number of times, thereby generating n counter values. The counter 412 outputs each of the n counter values to an associated cipher block generator. That is, the counter 412 outputs, to the first cipher block generator 413-1, the first counter value generated by incrementing the initial counter value by one. The counter 412 outputs, to the second cipher block generator 413-2, the second counter value generated by incrementing the initial counter value by two. In this manner, the counter 412 outputs, to the n-th cipher block generator 413-n, the n-th counter value generated by incrementing the initial counter value by n.

Each of the n cipher block generators receives the MTK and a counter value output from the counter 412, generates a cipher block, and outputs the generated cipher block to an associated XOR logical operator. The first cipher block generator 413-1 generates the first cipher block using the MTK and the first counter value output from the counter 412, and outputs the generated cipher block to the first XOR logical operator 415-1. In this manner, the n-th cipher block generator 413-n generates the n-th cipher block using the MTK and the n-th counter value output from the counter 412, and outputs the generated cipher block to the n-th XOR logical operator 415-n.

Each of the n XOR logical operators receives an associated plain text and a cipher block output from an associated cipher block generator, performs the XOR logical operation on the plain text and the cipher block, and generates and outputs an MBS stream. The first XOR logical operator 415-1 receives the first plain text and the first cipher block output from the first cipher block generator 413-1, performs an XOR logical operation on the first plain text and the first cipher block, and generates and outputs the first MBS stream. In this manner, the n-th XOR logical operator 415-n receives the n-th plain text and the n-th cipher block output from the n-th cipher block generator 413-n, performs an XOR logical operation on the n-th plain text and the n-th cipher block to generates the n-th MBS stream, and outputs the generated MBS stream to the MBS payload generator 450.

Figure 6:
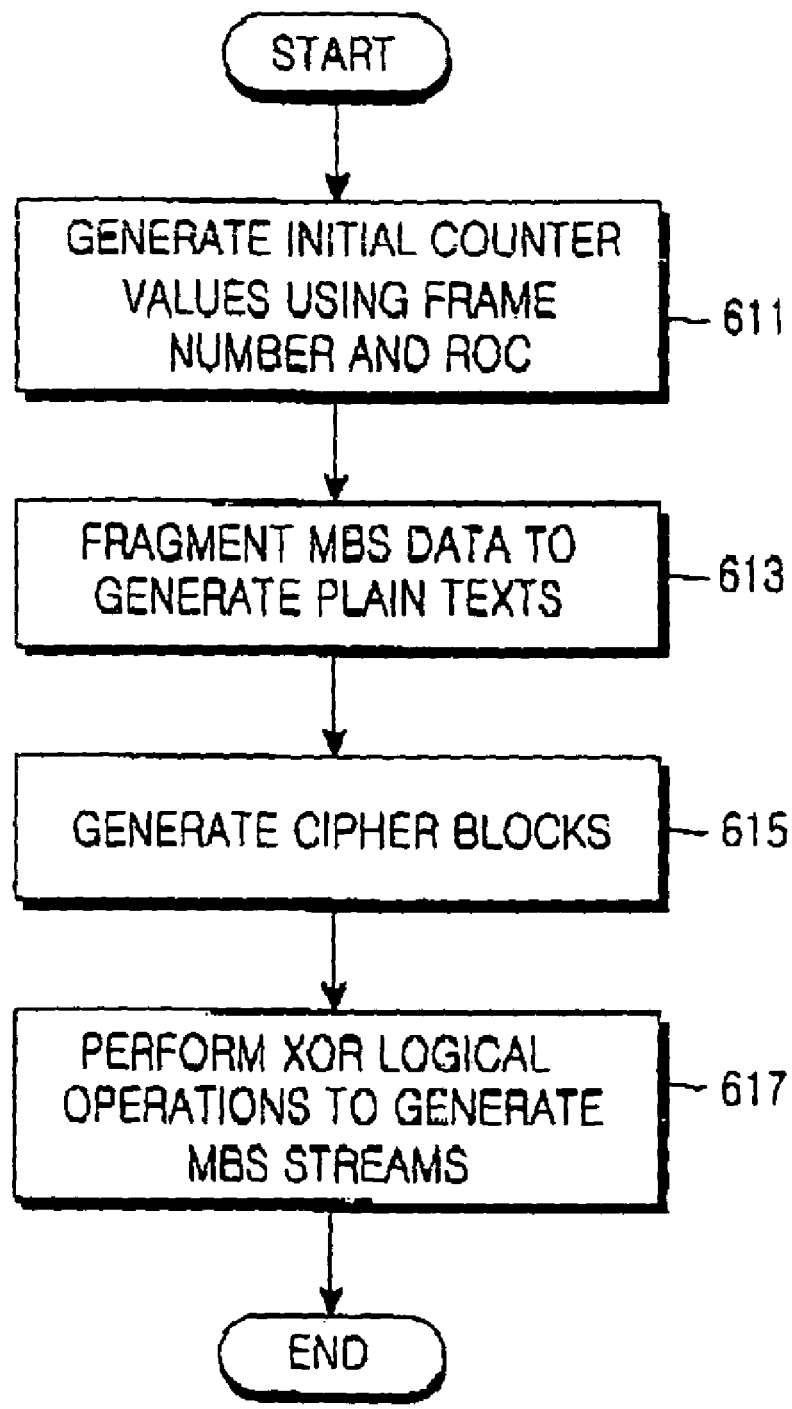
FIG. 6 is a flowchart illustrating an AES-CTR ciphering process of the IEEE 802.16 communication system in accordance with an embodiment of the present invention.

FIG. 6 is a flowchart illustrating the AES-CTR ciphering process of the IEEE 802.16 communication system in accordance with an embodiment of the present invention.

Referring to FIG. 6, the AES-CTR ciphering apparatus generates n initial counter values using a frame number and an ROC when MBS data to be transmitted is input in step 611. In step 613, the AES-CTR ciphering apparatus fragments the MBS data to generate n plain texts. In step 615, the AES-CTR ciphering apparatus generates n cipher blocks using the n initial counter values and an MTK. In step 617, the AES-CTR ciphering apparatus generates n MBS streams by XORing the n plain texts and the n cipher blocks. Then, the process is ended.

As is apparent from the above description, the present invention enables stable ciphering/deciphering by changing an initial counter value for ciphering/deciphering also in a time interval using an identical MBS traffic key (MTK). The present invention newly proposes a rollover counter (ROC) corresponding to additional data to be transmitted for ciphering/deciphering, thereby reducing the degradation of data transmission capacity due to the additional data transmission and increasing the total data transmission capacity.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting a signal by a signal transmission apparatus in a communication system, comprising the steps of:
generating, by the signal transmission apparatus, second ciphering information using a frame number of the communication system and first ciphering information for data to be transmitted;
ciphering, by the signal transmission apparatus, the data using the second ciphering information and third ciphering information; and
generating, by the signal transmission apparatus, a signal that includes the ciphered data and only the first ciphering information among the first ciphering information, the second ciphering information, and the third ciphering information, and transmitting the generated signal,
wherein the first ciphering information is a rollover counter (ROC),
wherein the ROC increases as the frame number of the communication system increases, and
wherein generating, by the signal transmission apparatus, the second ciphering information comprises:
generating, by the signal transmission apparatus, the second ciphering information by concatenating the frame number of the communication system and the ROC, and repeating a concatenation result a preset number of times.

2. The method of claim 1, wherein if the data is multicast and broadcast service (MBS) data, the third ciphering information is an MBS traffic key (MTK).

3. An apparatus for transmitting a signal in a communication system, comprising:
a second-ciphering-information generator for generating second ciphering information using a frame number of the communication system and first ciphering information for data to be transmitted;
a ciphering unit for ciphering the data to be transmitted using the second ciphering information and third ciphering information; and
a signal generator for generating a signal that includes the ciphered data and only the first ciphering information among the first ciphering information, the second ciphering information, and the third ciphering information,
wherein the first ciphering information is a rollover counter (ROC)
wherein the ROC increases as the frame number of the communication system increases, and
wherein the second-ciphering-information generator generates the second ciphering information by concatenating the frame number of the communication system and the ROC, and repeating a concatenation result a preset number of times.

4. The apparatus of claim 3, further comprising:
a transmitter for transmitting the generated signal.

5. The apparatus of claim 3, wherein if the data is multicast and broadcast service (MBS) data, the third ciphering information is an MBS traffic key (MTK).

6. A method for transmitting multicast and broadcast service (MBS) streams by a ciphering apparatus in a communication system, comprising the steps of:
generating, by the ciphering apparatus, an initial counter value using a frame number of the communication system and a rollover counter (ROC) for MBS data to be transmitted;
generating, by the ciphering apparatus, n counter values by incrementing the initial counter value by one;
generating, by the ciphering apparatus, n cipher blocks using the n counter values and an MBS traffic key (MTK);
fragmenting, by the ciphering apparatus, the MBS data into n plain texts;
generating, by the ciphering apparatus, n MBS streams by performing exclusive OR (XOR) logical operations on the n plain texts and the cipher blocks; and generating, by the ciphering apparatus, n MBS payloads and transmitting the n MBS payloads, wherein each of the n MBS payloads includes one of the n MBS streams and only the ROC among the ROC, the initial counter value, and the MTK, wherein the ROC increases as the frame number of the communication system increases, and wherein generating, by the ciphering apparatus, the initial counter value comprises:

generating, by the ciphering apparatus, the initial counter value by concatenating the frame number of the communication system and the ROC, and repeating a concatenation result a preset number of times.

7. An apparatus for transmitting multicast and broadcast service (MBS) streams in a communication system, comprising:

an initial counter value generator for generating an initial counter value using a frame number of the communication system and a rollover counter (ROC);

a counter for generating n counter values by incrementing the initial counter value by one for MBS data to be transmitted;

n cipher block generators for generating n cipher blocks using the n counter values and an MBS traffic key (MTK);

n exclusive OR (XOR) logical operators for performing XOR logical operations on the cipher blocks and n plain texts into which the MBS data is fragmented, and generating MBS streams;

an MBS payload generator for generating n MBS payloads; and a transmitter for transmitting the generated n MBS payloads, wherein each of the n MBS payloads includes one of the n MBS streams and only the ROC among the ROC, the initial counter value, and the MTK, wherein the ROC increases as the frame number of the communication system increases, and wherein the initial counter value generator generates the initial counter value by concatenating the frame number of the communication system and the ROC and repeating a concatenation result a preset number of times.

* * * * *